United States Patent
Koike et al.

(10) Patent No.: US 9,830,735 B2
(45) Date of Patent: Nov. 28, 2017

(54) MEDICAL IMAGE PROCESSING DEVICE AND IMAGE PROCESSING METHOD

(71) Applicant: Hitachi, Ltd., Tokyo (JP)

(72) Inventors: Takafumi Koike, Tokyo (JP); Takuma Shibahara, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 302 days.

(21) Appl. No.: 14/655,466

(22) PCT Filed: Dec. 28, 2012

(86) PCT No.: PCT/JP2012/084214
§ 371 (c)(1),
(2) Date: Sep. 10, 2015

(87) PCT Pub. No.: WO2014/103065
PCT Pub. Date: Jul. 3, 2014

(65) Prior Publication Data
US 2015/0379758 A1    Dec. 31, 2015

(51) Int. Cl.
*G06T 15/08* (2011.01)
*G06T 19/20* (2011.01)
(Continued)

(52) U.S. Cl.
CPC .......... *G06T 15/08* (2013.01); *G06T 15/506* (2013.01); *G06T 19/006* (2013.01); *G06T 19/20* (2013.01)

(58) Field of Classification Search
CPC .......................... G06T 15/503; G06T 2200/12
See application file for complete search history.

(56) References Cited

U.S. PATENT DOCUMENTS

2002/0158872 A1 * 10/2002 Randel .................. G06T 15/405
                                                                   345/426
2007/0262983 A1 * 11/2007 Choi ....................... G06T 15/04
                                                                   345/420
(Continued)

FOREIGN PATENT DOCUMENTS

EP          0676723 A2    10/1995
JP          7-282274 A    10/1995
(Continued)

OTHER PUBLICATIONS

New 3D Technology (online) http://www.samsungmedison.com/technology/new-3d-technology.jsp.
(Continued)

*Primary Examiner* — Kee M Tung
*Assistant Examiner* — Grace Q Li
(74) *Attorney, Agent, or Firm* — Mattingly & Malur, PC (57) ABSTRACT

This is comprising: a volume rendering unit for generating a two-dimensional rendered image by converting three-dimensional volume data into two-dimensional volume data; a depth information generator for generating depth information indicative of the length from a virtual view position in a virtual three-dimensional space to the three-dimensional volume data on the basis of the three-dimensional volume data; an anti-aliasing unit for identifying a target in the rendered image based on the depth information and executing anti-aliasing processing on an edge portion of the identified target; and a display unit for displaying an image including the target, on which the anti-aliasing processing has been executed, as a rendered image.

6 Claims, 8 Drawing Sheets

(51) Int. Cl.
*G06T 15/50* (2011.01)
*G06T 19/00* (2011.01)

(56) References Cited

U.S. PATENT DOCUMENTS

| | | | |
|---|---|---|---|
| 2009/0122076 A1* | 5/2009 | Zhong | G06T 15/503 |
| | | | 345/611 |
| 2010/0209013 A1* | 8/2010 | Minear | G06T 7/32 |
| | | | 382/260 |
| 2011/0087102 A1 | 4/2011 | Hamada et al. | |
| 2011/0181590 A1* | 7/2011 | Brabec | G06T 15/00 |
| | | | 345/424 |
| 2012/0154400 A1* | 6/2012 | Steen | G06T 15/08 |
| | | | 345/424 |
| 2013/0271455 A1 | 10/2013 | Tsujita | |

FOREIGN PATENT DOCUMENTS

| | | |
|---|---|---|
| JP | 9-305795 A | 11/1997 |
| JP | 2011-98191 A | 5/2011 |
| WO | 2012/101989 A1 | 8/2012 |

OTHER PUBLICATIONS

GPU Gems 3 Chapter 14. Advanced Techniques for Realistic Real-Time Skin Rendering, http://http.developer.nvidia.com/GPUGems3/gpugems3_ch14.html.
Erik Sunden et al., Image Plane Sweep Volume illumination, IEEE Transactions on Visualization and Computer Graphics, Dec. 2011, pp. 2125-2134, vol. 18, No. 2.
International Search Report of PCT/JP2012/084214.

* cited by examiner

MEDICAL IMAGE PROCESSING DEVICE AND IMAGE PROCESSING METHOD

TECHNICAL FIELD

The present invention relates to a medical image processing unit and image processing method for processing volume data and displaying images of, for example, tissues in a human body.

BACKGROUND ART

A background technology of this technical field is Volume Shade Imaging (NPL 1). This NPL 1 indicates that more realistic and highly-visible volume rendering images can be generated by synthesizing volume data, depth information, and edge information.

Furthermore, NPL 2 describes a method of realistically rendering human skins and faces. When rendering a face by this method, the face is divided into three layers, that is, dermis, epidermis, and oil. Regarding the dermis and the epidermis, there is a method called "Sub-Surface Scattering" as a rendering method of reproducing a sense of high quality in computer graphics and this method is used for rending them. Sub-surface scattering is a method used, for example, when creating computer graphics of humans and is a technique to reproduce physical phenomena of light transmitting for a minute distance or diffusing on the skin surface. The oil is mainly a portion to reproduce reflections of a face.

Furthermore, NPL 3 describes a method of volume-rendering materials with a undersurface scattering property. This method is a method for creating light volume indicating how the light is irradiated on from the direction of a light source.

CITATION LIST

Non Patent Literature

[NPL1] New 3D Technology http://www.samsungmedison.com/technology/new-3d-technology.jsp
[NPL2] GPU Gems 3 Chapter 14, Advanced Techniques for Realistic Real-Time Skin Rendering
[NPL3] A. Ynnerman, T. Ropinski, E. Sund, and E. Sunden, "Image plane sweep volume illumination," IEEE TVCG (Vis Proceedings), vol. 17, no. 12, pp. 2125-2134, 2011.

SUMMARY OF INVENTION

Problems to be Solved by the Invention

For example, an ultrasonic wave diagnostic device performs volume rendering for intuitive visualization. The ultrasonic wave diagnostic device which adopts volume rendering is for the medical use; and even if a diagnostic object is a human body, the resultant image may sometimes look inorganic and different from what it really is. A calculation model is generally used to express real optical properties in order to enhance the image quality, but there is a problem of an increase in computational complexity.

Furthermore, the ultrasonic waves have lower progressiveness than the light and wraparounds such as diffractions occur more intensively, so that generally noise elements such as speckles occur intensively in ultrasonic wave images as compared to optical photographs. Therefore, preprocessing such as removal of noises and obstacles and smoothing is required in order to obtain fine images; however, since the volume data is at least three-dimensional data, cost is the key problem in execution of the preprocessing on the entire data.

Furthermore, processing for generating rendered images by processing the volume data is divided into a part called "preprocessing" for executing removal of noises and extraction of members from original data, a part called "rendering" for visualizing the volume data into two-dimensional video images that humans can understand intuitively and sensuously, and a part called "post-processing" for adjusting toning and contrast of the two-dimensional video images. Under this circumstance, for example, when the computational complexity of the preprocessing increases, the entire computational complexity will increase. As a result, volume rendered images of high image quality cannot be generated without increasing the calculation cost.

It is an object of the present invention to provide a medical image processing unit and image processing method capable of generating the high-quality rendered images without increasing the calculation cost.

Means for Solving the Problems

In order to achieve the above-described object, the present invention is characterized in comprising: a volume rendering unit for generating a two-dimensional rendered image by converting three-dimensional volume data, which is input from a modality, into two-dimensional volume data; a depth information generator for generating depth information indicative of the length from a virtual view position in a virtual three-dimensional space to the three-dimensional volume data on the basis of the three-dimensional volume data; an anti-aliasing unit for identifying a target in the rendered image generated by the volume rendering unit based on the depth information generated by the depth information generator and executing anti-aliasing processing on an edge portion of the identified target; and a display unit for displaying an image including the target, on which the anti-aliasing processing has been executed, as a rendered image.

Advantageous Effects of Invention

According to the present invention, high-quality rendered images can be generated without increasing the calculation cost.

MODE FOR CARRYING OUT THE INVENTION

An embodiment of the present invention will be explained with reference to drawings.

Embodiment 1

In the present embodiment, an explanation will be given about an example of a volume rendering device that enhances resolution without increasing computational complexity.

Figure 1:
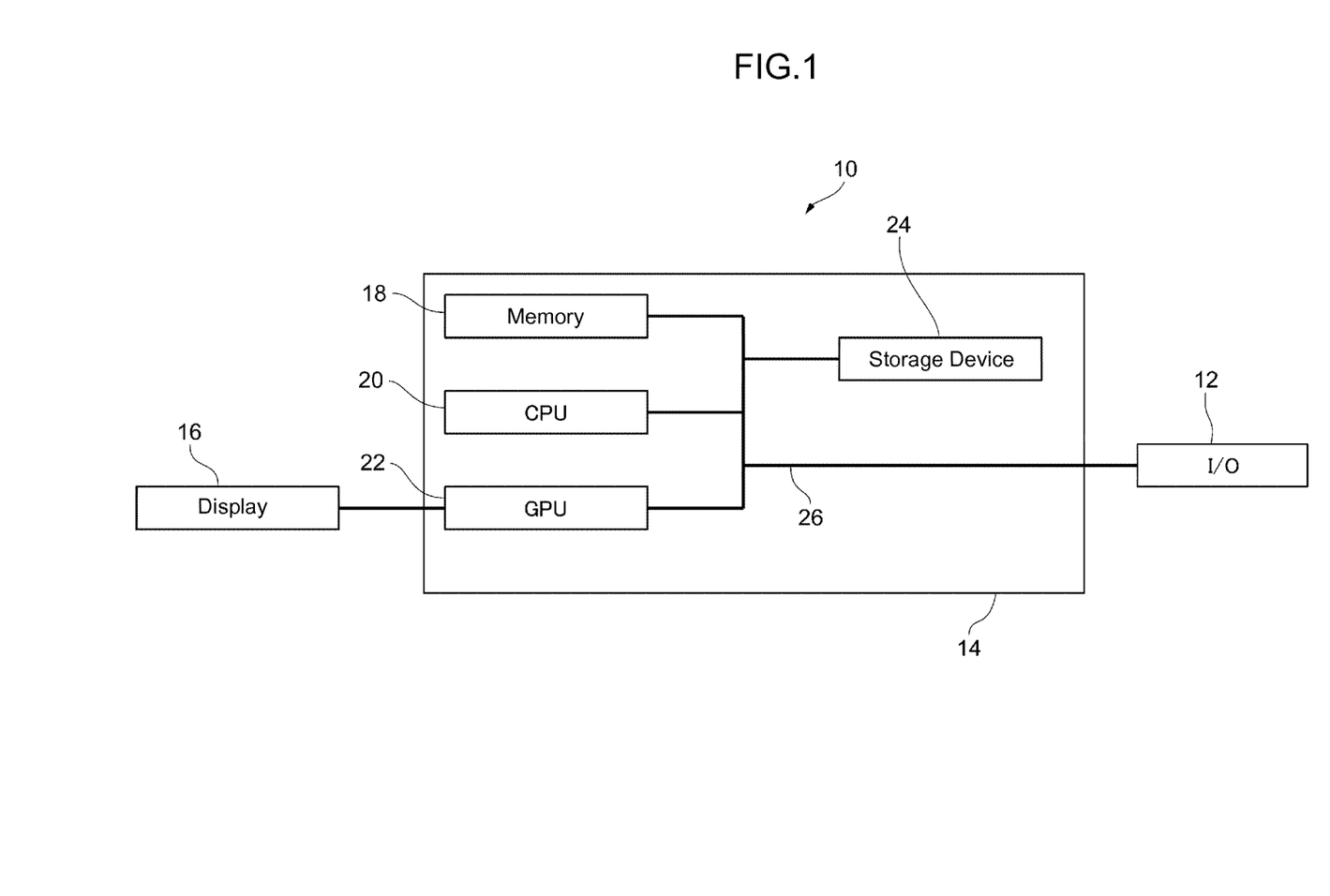
FIG. 1 is a configuration diagram of a medical image processing unit.

FIG. 1 is a configuration diagram of a medical image processing unit. Referring to FIG. 1, a medical image processing unit 10 includes an I/O interface 12, a volume rendering unit 14, and a display 16; and the I/O interface 12 is connected to the display 16 via the volume rendering unit 14. The volume rendering unit 14 is configured of a memory 18, a CPU (Central Processing Unit) 20, a GPU (Graphics Processing Unit) 22, and a storage device 24; and the respective components are connected to each other via a bus 26.

The I/O interface 12 is an interface for inputting three-dimensional volume data from a modality and functions as, for example, a volume data input unit for inputting volume data. For example, a detector for an ultrasonic wave diagnostic device can be used as the modality. This detector has a function that scans a fault plane (scan plane) inside a measuring object with ultrasonic waves from, for example, an ultrasonic probe, receives and digitalizes a reflection echo signal returned from each site of biological tissues of the fault plane, processes the digitalized data as frame data of the fault plane, and also generates the frame data (volume data of each tomographic image) acquired by scanning a plurality of scan planes as three-dimensional volume data. Incidentally, if the modality is a detector that generates an analog signal, it is possible to add a function of a converter for converting the analog signal to a digital signal to the I/O interface 12. Furthermore, the I/O interface 12 may be configured to include a probe connected to the ultrasonic probe.

The memory 18 constitutes a storage unit that stores various programs and data. The CPU 20 is a processor that supervises and controls the entire volume rendering unit 14, and executes various processing according to the programs stored in the memory 18. Incidentally, input devices such as a mouse and a keyboard are connected to the CPU 20. The GPU 22 executes data processing relating to the three-dimensional volume data which is input from the I/O interface 12 such as volume rendering processing to generate image data from the three-dimensional volume data, and then executes processing for displaying images according to the generated image data, such as volume rendered images, on the display 16. The storage device 24 is configured as a storage unit that stores, for example, the three-dimensional volume data.

Figure 2:
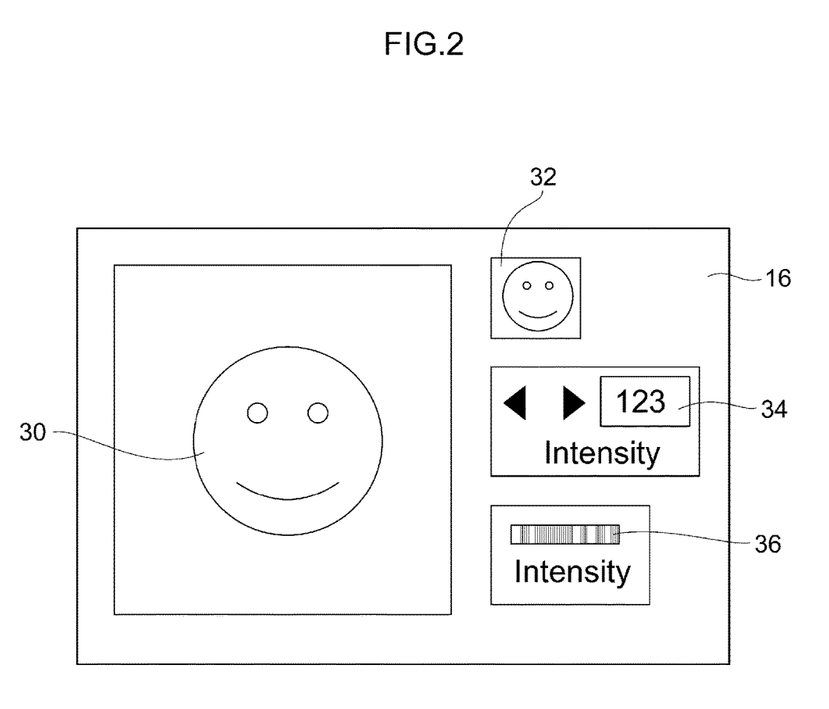
FIG. 2 is a configuration diagram of a display.

FIG. 2 is a configuration diagram of the display. Referring to FIG. 2, the display 16 is composed of, for example, a liquid crystal display, a touch panel display, or a three-dimensional display. The display 16 displays a rendered image 30 generated by the volume rendering processing of the GPU 22 and also displays a button 32, a numeric input box 34, and a slider bar 36.

The button 32 is a button on a touch panel or an on-off-type physical button and, for example, manipulation information indicating the presence or absence of anti-aliasing is input to the GPU 22 by manipulating the button 32. The numeric input box 34 is a box used to input a numerical value indicating the strength of anti-aliasing from, for example, the keyboard. For example, when the numerical value indicative of the anti-aliasing strength is input from the keyboard to the numeric input box 34, information indicative of the strength of anti-aliasing is input to the GPU 22. The slider bar 36 is a bar that adjusts the strength of anti-aliasing and color density of volume rendering by moving from side to side in response to the manipulation from the keyboard or the touch panel manipulation information corresponding to the position on the slider bar 36 is input, as information to adjust the strength of anti-aliasing and the color density of volume rendering, to the GPU 22.

Incidentally, the button 32 or the numeric input box 34 may be used as a button or box to adjust the color density of volume rendering. Furthermore, there is no limitation on the position of the button 32 on the display 16 and the button 32 may be located at any position on the display 16. It is also unnecessary to display all pieces of information together on the display 16 and the display 16 may be divided into two parts. For example, the display 16 can be composed of two displays, that is, an upper display and a lower display; and the upper display can be a liquid crystal display and the rendered image 30 can be displayed on the upper display; and the lower display can be a touch panel display and, for example, a plurality of buttons 32 and numeric input boxes 34 can be displayed on the lower display.

Figure 3:
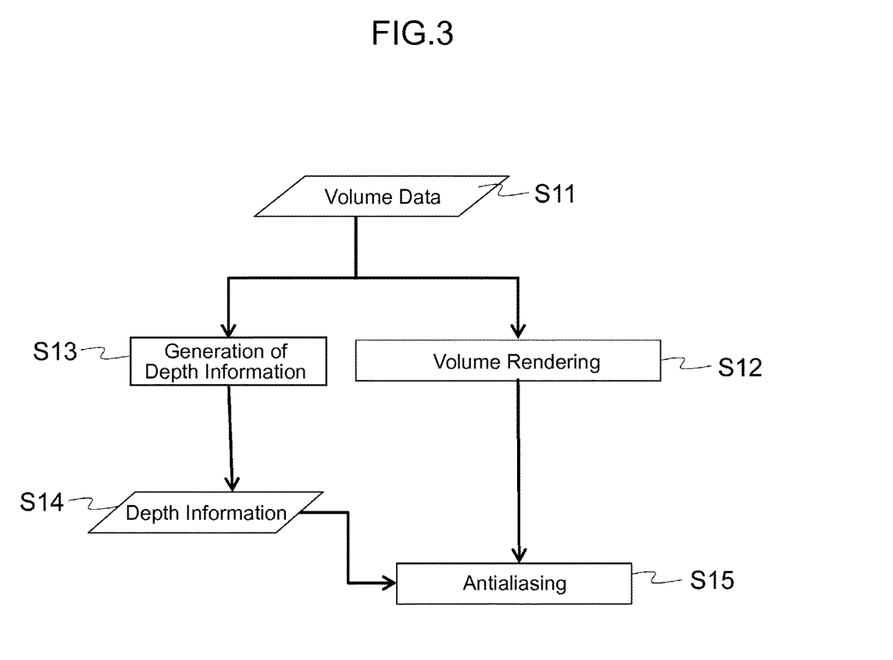
FIG. 3 is a flowchart for explaining processing for adding an anti-aliasing effect to a rendered image by using depth information.

FIG. 3 is a flowchart for explaining processing for adding the anti-aliasing effect to a rendered image by using depth information. This processing is executed by the GPU 22.

The GPU 22 inputs the three-dimensional volume data from the input interface 12 (S11). The three-dimensional volume data is normally a three-dimensional array and each array element is an integer number value expressed in 8 bits. Incidentally, floating point data of about 16 bits can also be used as the three-dimensional volume data.

Next, the GPU 22 executes volume rendering processing for generating a two-dimensional rendered image based on the three-dimensional volume data (S12) and executes processing for generating the depth information based on the three-dimensional volume data (S13). A rendered image is two-dimensional array elements and each array element is an 8-bit integer number value. Furthermore, each array element includes integer number vector values respectively indicating components of red, blue, and green, that is, light's three primary colors. Incidentally, floating point vector values can be used instead of the integer number vector values.

The GPU 22 executes ray casting in order to calculate a depth value of the volume data when generating the depth information based on the three-dimensional volume data. Ray casting is processing for extending a line segment between a virtual view position, which is set in a virtual three-dimensional space, and the position of a two-dimensional array corresponding to a rendered image plane and integrating the position at which the extended line segment intersects with the volume data. This processing is executed using the resolution of the volume as final resolution.

Next, the GPU 22 retains the depth information obtained by the processing in step S13 (S14). Under this circumstance, the depth information is two-dimensional array elements in the same manner as the rendered image and each array element is normally an integer number value expressed in about 8 bits. Incidentally, floating points can be used instead of the integer number values.

If ray marching is used as an algorithm for volume rendering as a method for determining the depth information, there are a method of determining depth coordinates at a position before collision of a ray to be a depth value and a method of creating a polygon from volume data by means such as marching cubes and using a depth value of the created polygon. The method of determining the depth value from the polygon is a common method in surface rendering technology; and, for example, if a Z-buffer method is used as surface rendering rendering, a Z-buffer value can be used as the depth value.

Next, the GPU 22 identifies a target in the rendered image obtained by the processing in step S12 based on the depth information retained in step S14, executes anti-aliasing processing for grading an edge portion in the identified target, generates the rendered image 30 as a high-resolution final image, displays the generated rendered image 30 on the display 16 (S15), and then terminates the processing in this routine.

Figure 4:
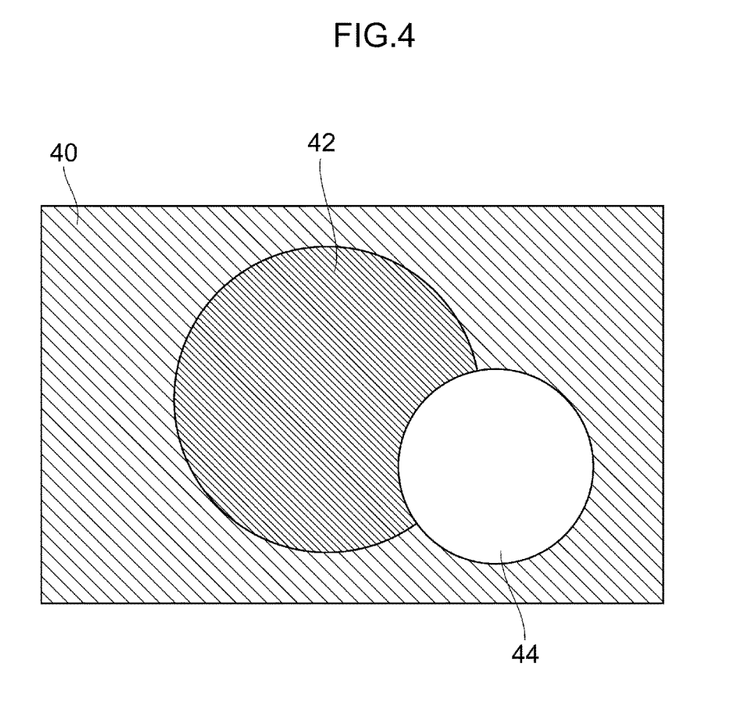
FIG. 4 is a conceptual diagram of an image identified by depth information.

FIG. 4 is a conceptual diagram of images identified by the depth information. Referring to FIG. 4, if the images identified by the depth information are gray scale images, an image identified by the depth information at a position located farthest from the virtual view position in (the back of) the virtual three-dimensional space is a black image 40. Also, an image identified by the depth information at an intermediate position from the virtual view position in the virtual three-dimensional space is a gray image 42, and an image identified by the depth information at a position closest to the virtual view position in (front of) the virtual three-dimensional space is a white image 44.

In the present embodiment, the GPU 22 functions as a data processing unit for processing the three-dimensional volume data and also functions as: a volume rendering unit that generates the two-dimensional rendered image by converting the three-dimensional volume data into the two-dimensional volume data; a depth information generator that generates the depth information indicative of the length from the virtual view position in the virtual three-dimensional space to the three-dimensional volume data on the basis of the three-dimensional volume data which is input to the volume data input unit; and an anti-aliasing unit that identifies the target in the rendered image generated by the volume rendering unit based on the depth information generated by the depth information generator and executes the anti-aliasing processing on the edge portion of the identified target. Furthermore, the display 16 functions as a display unit that displays the image including the target, on which the anti-aliasing processing has been executed, as the rendered image.

The present embodiment is designed to generate the two-dimensional rendered image based on the three-dimensional volume data and also generate the two-dimensional depth information, identify the target in the generated rendered image based on the generated depth information, and execute the anti-aliasing processing on the edge portion in the identified target. So, the high-resolution rendered image 30 can be generated without increasing the computational complexity. As a result, the high-quality rendered image 30 can be generated without increasing the calculation cost.

Embodiment 2

The present embodiment is designed to remove obstacles and suspended matters by using the depth information and the configuration of the medical image processing unit 10 is the same as that of Embodiment 1.

Figure 5:
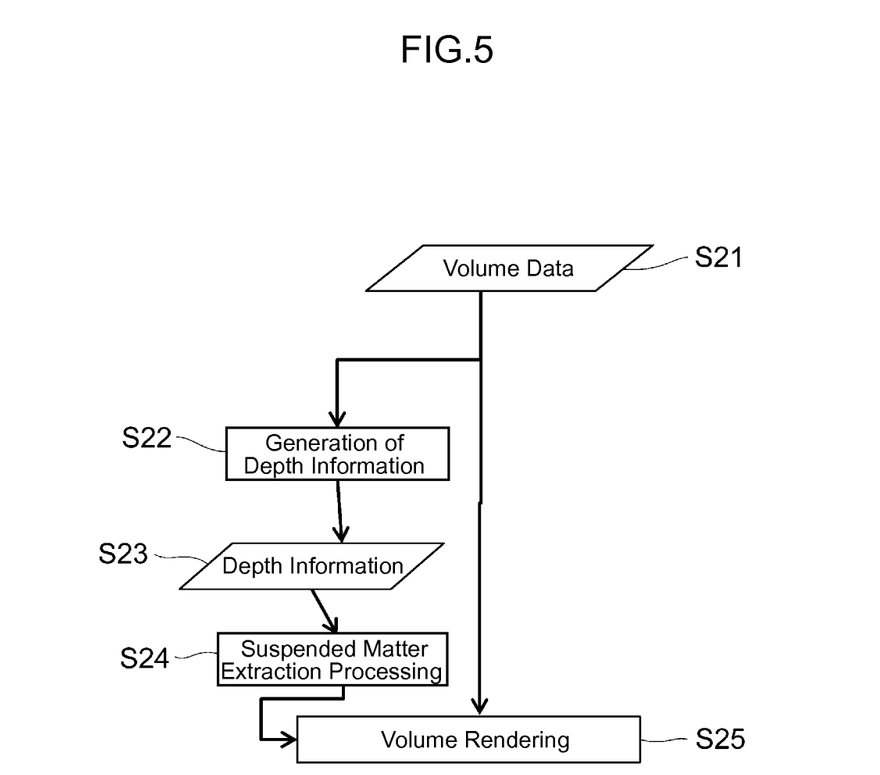
FIG. 5 is a flowchart for explaining processing for removing obstacles and suspended matters by using the depth information.

FIG. 5 is a flowchart for explaining processing for removing the obstacles and suspended matters by using the depth information. This processing is executed by the GPU 22.

The GPU 22 inputs the three-dimensional volume data from the input interface 12 (S21). The same data as that used in Embodiment 1 can be used as the three-dimensional volume data.

Next, the GPU 22 executes processing for generating the depth information based on the three-dimensional volume data (S22) and retains the depth information obtained by this processing (S23). Under this circumstance, the same depth information as that of Embodiment 1 can be used as the depth information.

Next, the GPU 22 executes processing for extracting suspended matters and obstacles based on the retained depth information (S24). Under this circumstance, the GPU 22 extracts the size and thickness of a suspended matter and extracts an obstacle by using the difference in the depth information at adjacent positions. In this case, it is also possible to change parameters for identifying objects to be extracted by using the button 32 and the numeric input box 34. Examples of the parameters are, for example, the size and thickness of the obstacle, and the difference in the depth information. For example, an area value can be used as the size of the obstacle.

Next, the GPU 22 generates a high-resolution final image by executing volume rendering processing for generating a two-dimensional rendered image based on the three-dimensional volume data (S25), and then terminates the processing in this routine. Incidentally, after step S58, the GPU 22 can identify the target in the rendered image based on the depth information and execute the anti-aliasing processing for grading the edge portion in the identified target.

Under this circumstance, the GPU 22 generates the two-dimensional rendered image by ignoring the volume data corresponding to the suspended matters and obstacles, which are extracted by the processing in step S24, among the three-dimensional volume data. Specifically speaking, the GPU 22 removes the volume data corresponding to the suspended matters and the obstacles from the input three-dimensional volume data, generates the rendered image, which is the high-resolution final image, by using volume data remaining after the removal of the volume data corresponding to the suspended matters and the obstacles, and displays the generated rendered image 30 on the display 16.

In the present embodiment, the removal of the obstacles and noises, which is normally performed by preprocessing, is performed by post-processing. So, it is possible to suppress an increase of the computational complexity.

Figure 6:
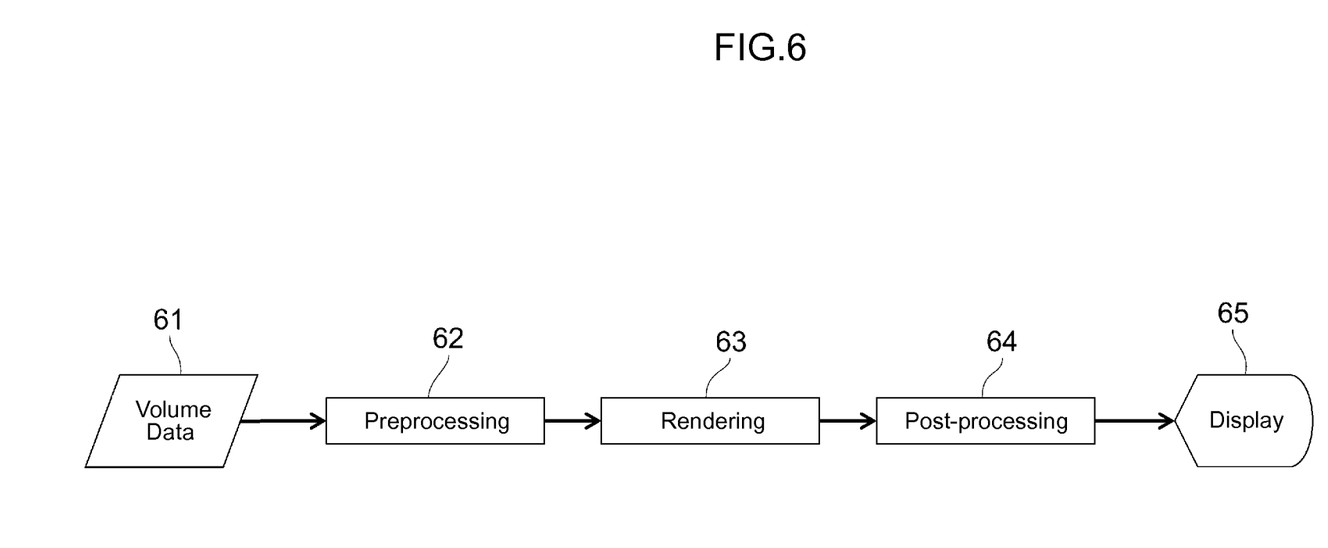
FIG. 6 is a process explanatory diagram for explaining the steps of processing volume data.

FIG. 6 is a process explanatory diagram for explaining the steps of processing on the volume data. Referring to FIG. 6, when preprocessing 62 is executed on the volume data 61, rendering processing 63 is then executed, and post-processing 64 is executed after the rendering processing 63, and finally processing 65 for displaying a rendered image, which is obtained by the post-processing 64, on the display 16 is executed and if first-dimensional size of the volume data 61 is N, the computational complexity of the preprocessing 62 becomes data size of the cube of N. When the preprocessing 62 in the order of square is executed on this volume data 61, calculation time becomes N to the power of 6. Furthermore, if the first-dimensional size of the final two-dimensional image is M, the computational complexity of the rendering processing 63 becomes data size of the square of M. Normally, in a case that N is nearly equal to M, the computational complexity of the rendering processing 63 becomes the cube of N. Furthermore, the computational complexity of the post-processing 64 becomes approximately the square of M (is nearly equal to N squared). Therefore, when the suspended matters and the obstacles are extracted by the post-processing, it gives rise to the effect of considerably reducing the computational complexity.

In the present embodiment, the GPU 22 functions as the volume rendering unit and the depth information generator and also functions as a suspended matter extractor that extracts the volume data corresponding to the suspended matters based on the depth information generated by the depth information generator. Under this circumstance, the volume rendering unit removes the volume data extracted by the suspended matter extractor from the input three-dimensional volume data and generates the two-dimensional rendered image based on volume data remaining after the removal of the above-described volume data.

The present embodiment is designed to generate the two-dimensional depth information based on the three-dimensional volume data, extract the suspended matters and the obstacles based on the generated depth information, remove the volume data corresponding to the extracted suspended matters and obstacles from the three-dimensional volume data, and generate the two-dimensional rendered image from the volume data from which the volume data corresponding to the extracted suspended matters and obstacles has been removed. So, the high-resolution rendered image 30 can be generated without increasing the computational complexity.

Embodiment 3

The present embodiment is designed to add an oil layer (oily shine) effect by using light source information and the depth information and the configuration of the medical image processing unit 10 is the same as that of Embodiment 1.

Figure 7:
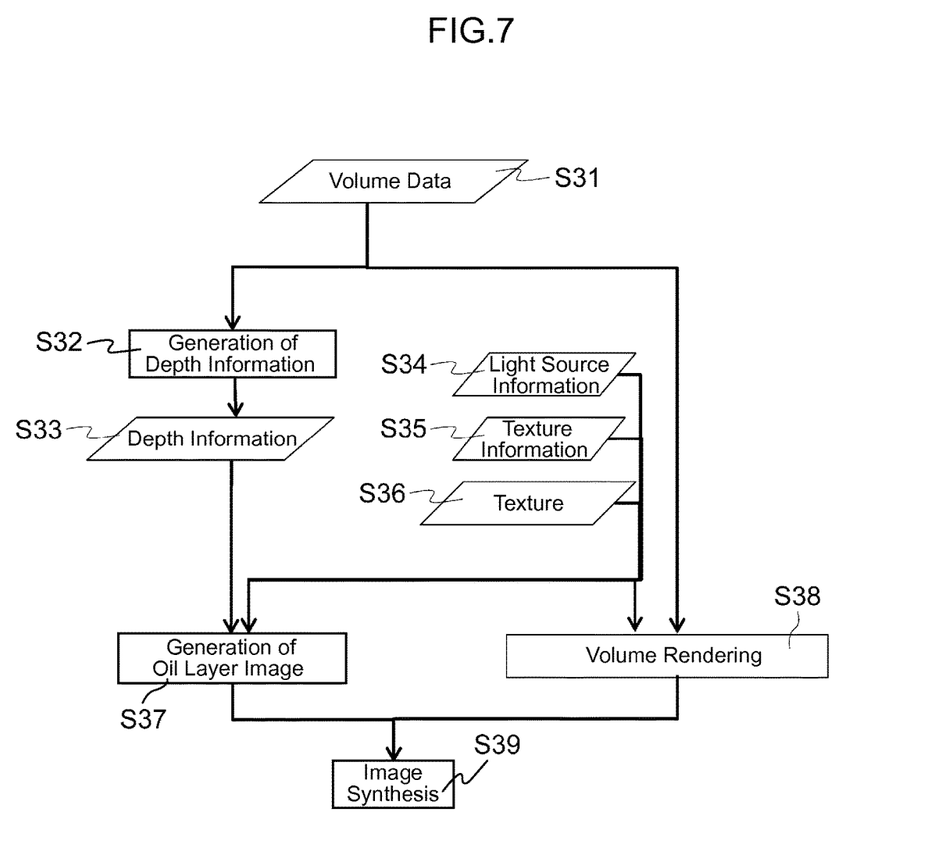
FIG. 7 is a flowchart for explaining processing for adding an oil layer (oily shine) effect by using light source information and depth information.

FIG. 7 is a flowchart for explaining processing for adding the oil layer (oily shine) effect by using the light source information and the depth information. This processing is executed by the GPU 22.

The GPU 22 inputs the three-dimensional volume data from the input interface 12 (S31). The same data as that used in Embodiment 1 can be used as the three-dimensional volume data.

Next, the GPU 22 executes processing for generating the depth information based on the three-dimensional volume data (S32) and retains the depth information obtained by this processing (S33). Under this circumstance, the same depth information as that of Embodiment 1 can be used as the depth information.

Next, the GPU 22 inputs the light source information (S34), also inputs texture information (S35), and further inputs texture (S36), and generates an oil layer image based on the light source information, the texture information, and the texture which are input, and the retained depth information (S37).

Under this circumstance, the light source information is information indicative of the shape, strength, brightness, position, and orientation of the light source. The texture information is information indicative of how the light is irradiated on. The texture is information indicative of patterns and reflection properties of the object irradiated with the light from the light source.

Meanwhile, the GPU 22 generates a two-dimensional rendered image by executing volume rendering processing based on the light source information, the texture information, and the texture which are input, and the input three-dimensional volume data (S38). Incidentally, after step S38, the GPU 22 can identify the target in the rendered image based on the depth information and execute the anti-aliasing processing for grading the edge portion in the identified target.

Subsequently, the GPU 22 synthesizes the generated two-dimensional rendered image and the generated oil layer image (S39), displays the synthesized image as a high-resolution rendered image 30 on the display 16, and then terminates the processing in this routine. In this case, the oil layer effect is added to the generated two-dimensional rendered image when synthesizing the generated two-dimensional rendered image and the generated oil layer image.

Adding the oil layer effect herein mentioned means adding so-called specular effect to a contour portion of the volume data. The specular effect is also called "mirror reflection" and is the effect of light, which enters from the virtual light source, exiting symmetrically with respect to a normal line of the contour of the volume data. The contour of the volume data is the edge between the outside and the inside, for example, where a voxel having a value less than a threshold value is the outside and the voxel having a value equal to or more than the threshold value is the inside. The normal line can be determined from, for example, the difference between depth values of respective picture elements adjacent to each other.

Figure 8:
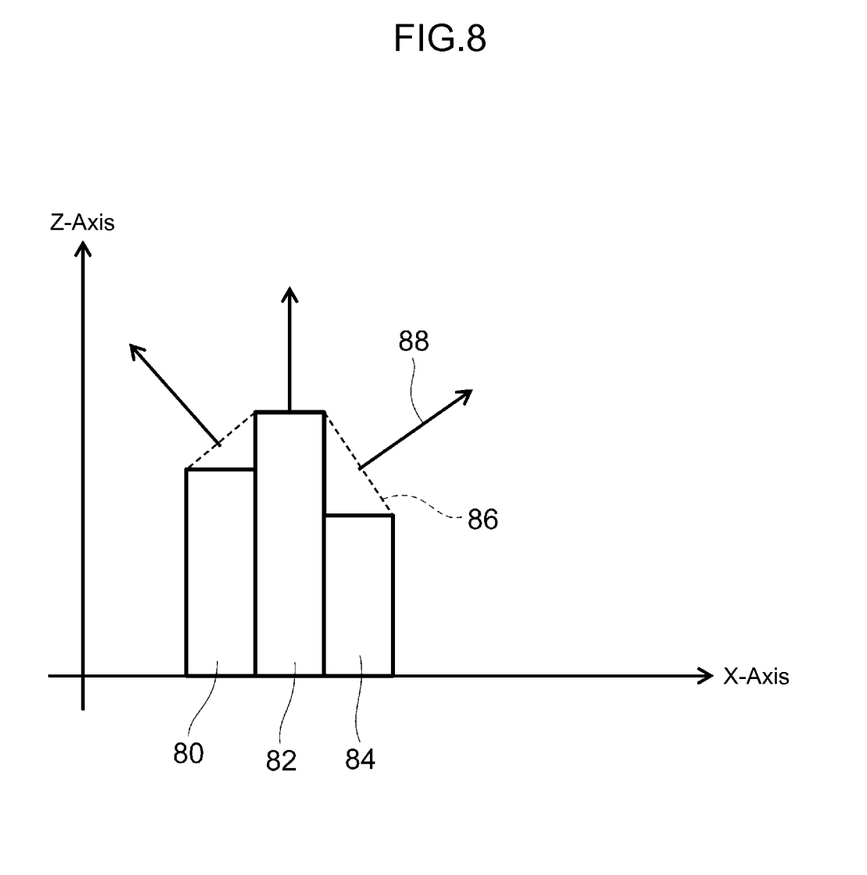
FIG. 8 is a configuration diagram of the depth information for explaining a method for determining a normal line from depth values.

FIG. 8 is a configuration diagram of the depth information for explanation of a method of determining the normal line from the depth values. Referring to FIG. 8, when a plurality of picture elements 80, 82, 84 are plotted by setting one line of the depth information as an X-axis and a depth value as a Z-axis, for example, a line perpendicular to a line segment 86 connecting a depth value of the picture element 82 and a depth value of the picture element 84 can be determined as a normal line 88. Since the processing for determining the normal line 88 from the depth values of the picture elements 82, 84 is an calculation using the two-dimensional image, the computational complexity can be reduced more than a case where the volume data is used as it is.

In the present embodiment, the GPU 22 functions as the volume rendering unit and the depth information generator and also functions as: an oil layer image generator that inputs the light source information, the texture information, and the texture and also inputs the depth information generated by the depth information generator, and generates the oil layer image based on the input information; and an image synthesizer that synthesizes the oil layer image generated by the oil layer image generator and the rendered image generated by the volume rendering unit and displays the synthesized image as the rendered image on the display unit. Under this circumstance, the volume rendering unit inputs the light source information, the texture information, and the texture and corrects the rendered image based on the input information. Incidentally, when generating the oil layer image, the oil layer can be generated based on the light source information and the depth information.

The present embodiment is designed to add the oil layer effect when generating the two-dimensional rendered image. So, the rendered image 30 whose resolution is high and to which the oil layer effect is added can be generated without increasing the computational complexity.

Embodiment 4

The present embodiment is designed to add effects such as shadows and lighting from polygon information and the configuration of the medical image processing unit 10 is the same as that of Embodiment 1.

Figure 9:
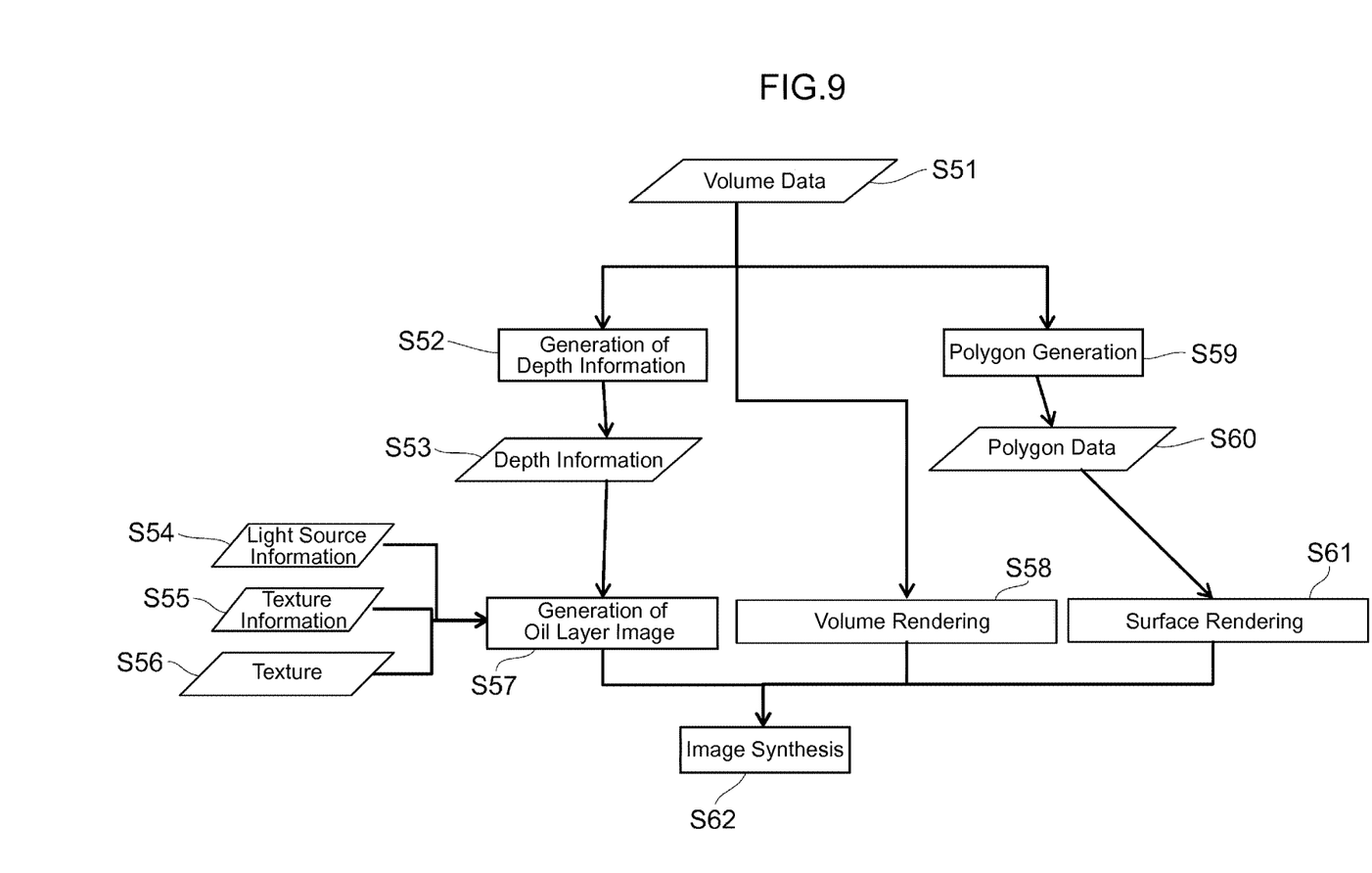
FIG. 9 is a flowchart for explaining processing for adding effects such as shadows and lighting from polygon information.

FIG. 9 is a flowchart for explaining processing for adding the effects such as shadows and lighting from the polygon information. This processing is executed by the GPU 22.

The GPU 22 inputs the three-dimensional volume data from the input interface 12 (S51). The same data as that used in Embodiment 1 can be used as the three-dimensional volume data.

Next, the GPU 22 executes processing for generating the depth information based on the three-dimensional volume data (S52) and retains the depth information obtained by this processing (S53). Under this circumstance, the same depth information as that of Embodiment 1 can be used as the depth information.

Next, the GPU 22 inputs the light source information (S54), also inputs the texture information (S55), and further inputs the texture (S56), and generates an oil layer image based on the light source information, the texture information, and the texture which are input, and the retained depth information (S57).

Under this circumstance, the light source information is information indicative of the shape, strength, brightness, position, and orientation of the light source. The texture information is information indicative of how the light is irradiated on. The texture is information indicative of patterns and reflection properties of the object irradiated with the light from the light source.

Meanwhile, the GPU 22 generates a two-dimensional rendered image by executing volume rendering processing based on the light source information, the texture information, and the texture which are input, and the input three-dimensional volume data (S58). Incidentally, after step S58, the GPU 22 can identify the target in the rendered image based on the depth information and execute the anti-aliasing processing for grading the edge portion in the identified target.

Furthermore, the GPU 22 generates polygon data by polygonizing the input volume data (S59), retains the generated polygon data (S60), and generates a two-dimensional surface image by executing the surface rendering processing based on the retained polygon data and the light source information, the texture information, and the texture which are input (S61). Under this circumstance, a polygon is of a polygonal shape formed of a group of three-dimensional vertex coordinates in a certain order. Normally, a triangle is used as the polygon among polygonal shapes constituting polygons.

Subsequently, the GPU 22 synthesizes the generated two-dimensional rendered image, the generated oil layer image, and the generated two-dimensional surface image (S62), displays the synthesized image as a high-resolution rendered image 30 on the display 16, and then terminates the processing in this routine. Under this circumstance, the rendered image 30 is displayed as a rendered image, to which the effects such as shadows and lighting are added, on the display 16.

Incidentally, when generating the oil layer image, it is also possible to generate an oil layer based on the light source information and the depth information. Furthermore, when generating a depth value, it is also possible to generate polygons by using a method, such as marching cubes, of generating the polygons from the volume data and then generate the depth value from the generated polygons. When the depth value is generated from the polygons, a polygon rendering method such as the Z-buffer method can be used by using the same virtual view position and angle of view as used in the case of volume rendering. In the case of the Z-buffer method, a Z-buffer value at the time of termination of rendering becomes the depth value. Furthermore, a specular reflection can be realized by using the polygons, the virtual view point, the virtual light source, and the shading method.

In the present embodiment, the GPU 22 functions as the volume rendering unit, the depth information generator, and the oil layer image generator and also functions as: a polygon generator that generates a plurality of polygons from the three-dimensional volume data; a surface rendering unit that generates a surface image by executing the surface rendering processing on the polygon data belonging to each polygon generated by the polygon generator; and an image synthesizer that synthesizes the oil layer image generated by the oil layer image generator, the rendered image generated by the volume rendering unit, and the surface image generated by the surface rendering unit, and displays the synthesized image as a rendered image on the display unit.

The present embodiment is designed so that the effects such as shadows and lighting are added when generating two-dimensional rendered images. So, the rendered image 30 whose resolution is high and to which the effects such as shadows and lighting are added can be generated without increasing the computational complexity.

Incidentally, the present invention is not limited to the aforementioned four embodiments, and includes various variations. For example, the aforementioned embodiments have been described in detail in order to explain the invention in an easily comprehensible manner and are not necessarily limited to those having all the configurations explained above. It is also possible to replace part of the configuration of an embodiment with the configuration of another embodiment and to add the configuration of the other embodiment to the configuration of an embodiment. Furthermore, regarding part of the configuration of each embodiment, the configuration of another configuration can be added, deleted, or used for replacement.

Furthermore, part or all of the aforementioned configurations, functions, processing units, processing means, and so on may be realized by hardware by, for example, designing them in integrated circuits. Also, each of the aforementioned configurations, functions, and so on may be realized by software by processors interpreting and executing programs for realizing each of the functions. Information such as programs, tables, and files for realizing each of the functions may be recorded and retained in memories, storage devices such as hard disks and SSDs (Solid State Drives), or storage media such as IC (Integrated Circuit) cards, SD (Secure Digital) memory cards, and DVDs (Digital Versatile Discs).

REFERENCE SIGNS LIST

10 Medical image processing unit; 12 I/O interface; 14 volume rendering unit; 16 display; 18 memory; 20 CPU; 22 GPU; 24 storage device; 30 rendered image; 32 button; 34 numeric input box; and 36 slider bar.

The invention claimed is:
1. A medical image processing unit comprising:
a volume data input unit for inputting three-dimensional volume data from a modality;
a volume rendering unit for inputting light source information indicating a shape, position, and orientation of a light source, inputting texture information indicating a pattern and a reflection property of an object irradiated with a light source, generating a two-dimensional rendered image by converting the three-dimensional volume data, which is input to the volume data input unit, into two-dimensional volume data, and correcting the two-dimensional rendered image based on the input light source information and texture information;

a depth information generator for generating depth information indicative of length from a virtual view position in a virtual three-dimensional space to the three-dimensional volume data on the basis of the three-dimensional volume data which is input to the volume data input unit;

an anti-aliasing unit for identifying a target in the rendered image generated by the volume rendering unit based on the depth information generated by the depth information generator and executing anti-aliasing processing on an edge portion of the identified target;

a display unit for displaying an image including the target, on which the anti-aliasing processing has been executed, as a rendered image;

an oil layer image generator for generating an oil layer image based on the input light source information and texture information; and an image synthesizer for synthesizing the oil layer image generated by the oil layer image generator and the rendered image generated by the volume rendering unit and displaying a synthesized image as the rendered image on the display unit.

2. The medical image processing unit according to claim 1,
wherein a suspended matter extractor for extracting volume data corresponding to a suspended matter based on the depth information generated by the depth information generator and the volume rendering unit removes the volume data extracted by the suspended matter extractor from the input three-dimensional volume data and generates the two-dimensional rendered image based on volume data remaining after the removal of the above-mentioned volume data.

3. The medical image processing unit according to claim 1, further comprising:
a polygon generator for polygon data by polygonizing the three-dimensional volume data which is input to the volume data input unit;
a surface rendering unit for generating a surface image by executing surface rendering processing on the polygon data generated by the polygon generator; and
an image synthesizer for synthesizing the oil layer image generated by the oil layer image generator, the rendered image generated by the volume rendering unit, and the surface image generated by the surface rendering unit and displaying a synthesized image as the rendered image on the display unit.

4. An image processing method for a medical image processing unit including:
a volume data input unit for inputting three-dimensional volume data from a modality; a data processing unit for processing the three-dimensional volume data which is input to the volume data input unit; and a display unit for displaying a processing result of the data processing unit, the data processing unit executing steps comprising:

inputting light source information indicating a shape, position, and orientation of a light source, inputting texture information indicating a pattern and a reflection property of an object irradiated with a light source, a volume rendering step of generating a two-dimensional rendered image by converting the three-dimensional volume data, which is input to the volume data input unit, into two-dimensional volume data;

correcting the two-dimensional rendered image based on the input light source information and texture information;

a depth information generation step of generating depth information indicative of length from a virtual view position in a virtual three-dimensional space to the three-dimensional volume data on the basis of the three-dimensional volume data which is input to the volume data input unit;

an anti-aliasing step of identifying a target in the rendered image generated in the volume rendering step based on the depth information generated in the depth information generation step and executing anti-aliasing processing on an edge portion of the identified target;

displaying, by the display unit an image including the target, which has been processed in the anti-aliasing step, as a rendered image;

generating an oil layer image based on the input light source information and texture information; and synthesizing the oil layer image generated by the oil layer image generator and the rendered image generated by the volume rendering unit and displaying a synthesized image as the rendered image on the display unit.

5. The image processing method according to claim 4,
wherein the data processing unit executes a suspended matter extraction step of extracting volume data corresponding to a suspended matter based on the depth information generated in the depth information generation step; and in the volume rendering step, the data processing unit removes the volume data extracted in the suspended matter extraction step from the input three-dimensional volume data and generates the two-dimensional rendered image based on volume data remaining after the removal of the above-mentioned volume data.

6. The image processing method according to claim 4,
wherein the data processing unit executes:
a polygon generation step of generating polygon data by polygonizing the three-dimensional volume data which is input to the volume data input unit;
a surface rendering step of generating a surface image by executing surface rendering processing on the polygon data generated in the polygon generation step; and
an image synthesis step of synthesizing the oil layer image generated in the oil layer image generation step, the rendered image generated in the volume rendering step, and the surface image generated in the surface rendering step and displaying a synthesized image as the rendered image on the display unit.

* * * * *